UNITED STATES PATENT OFFICE.

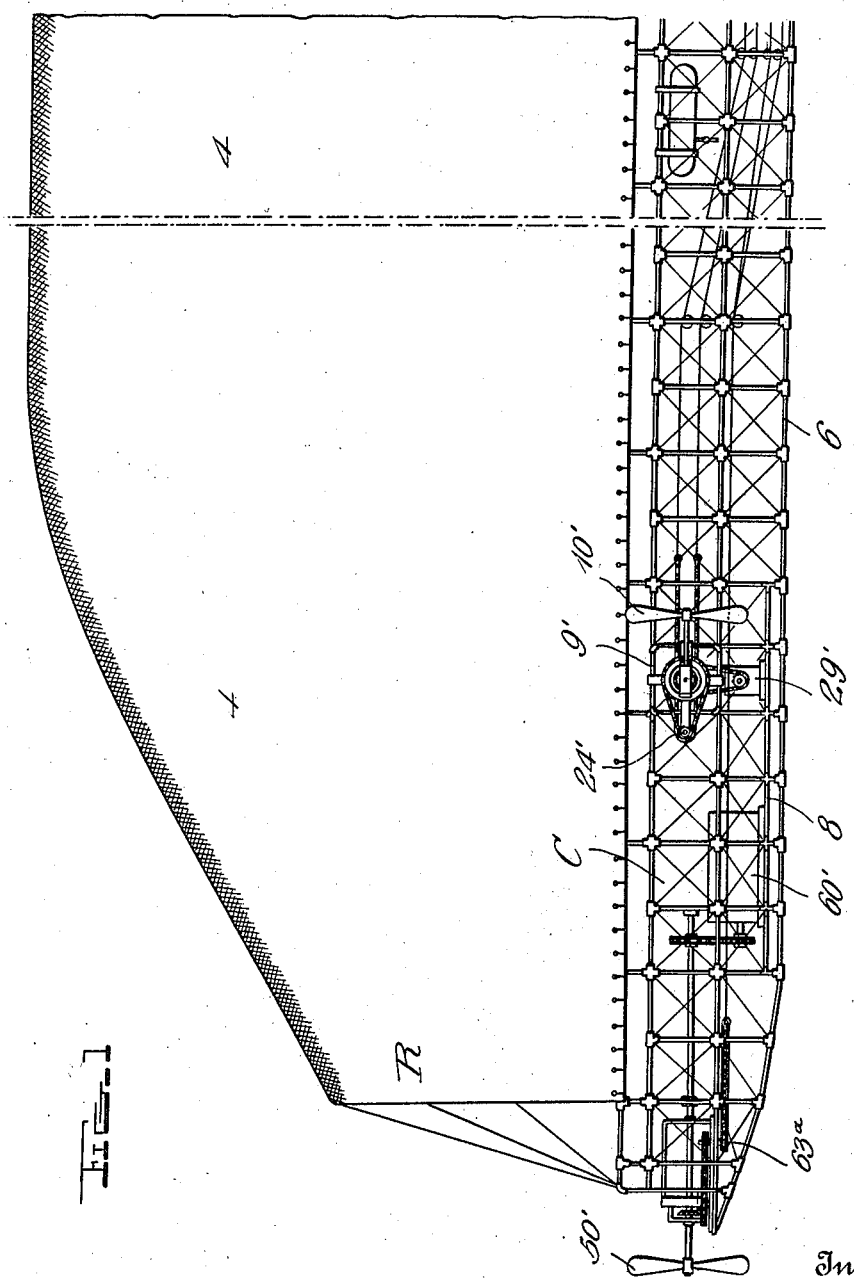

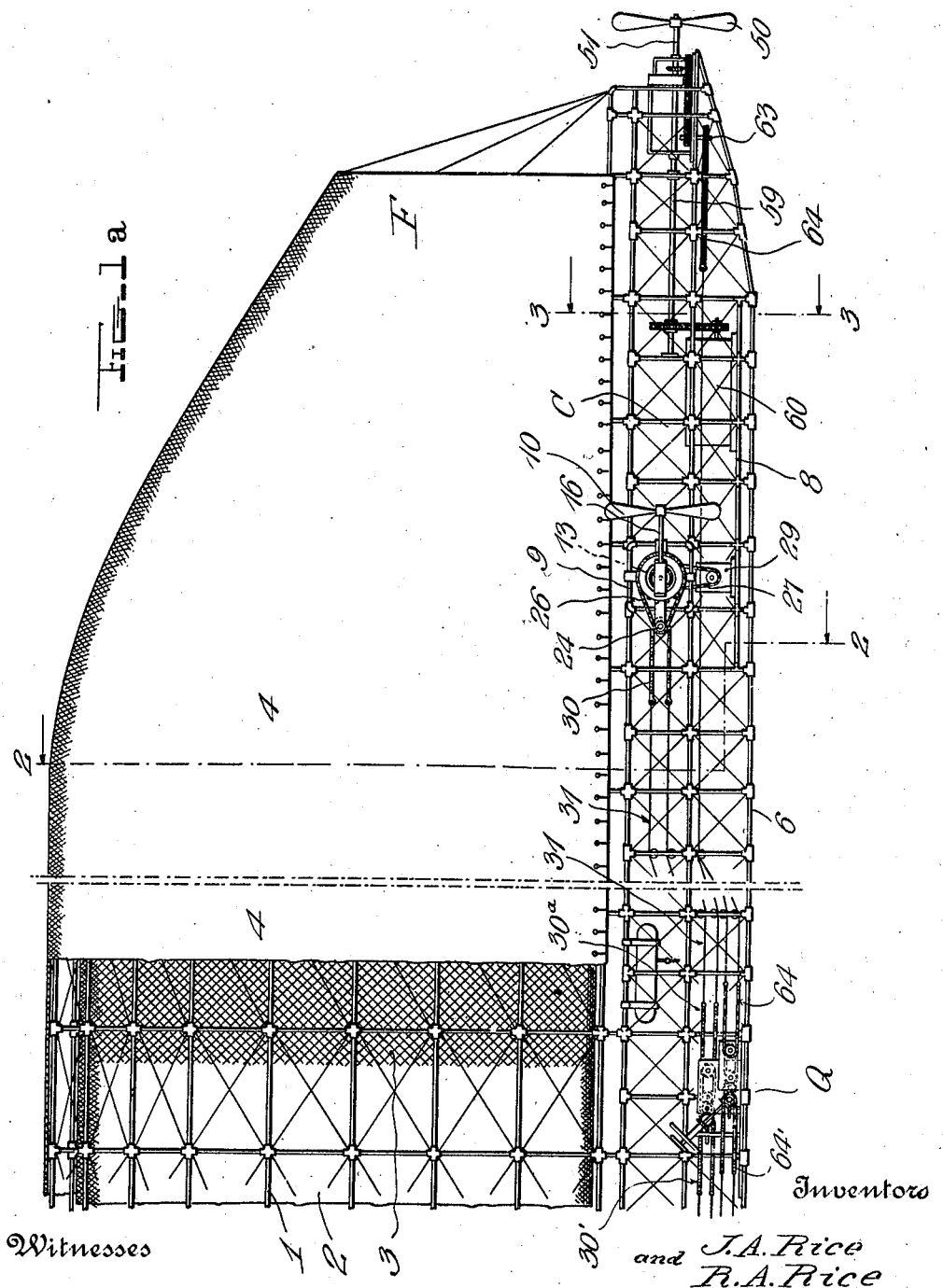

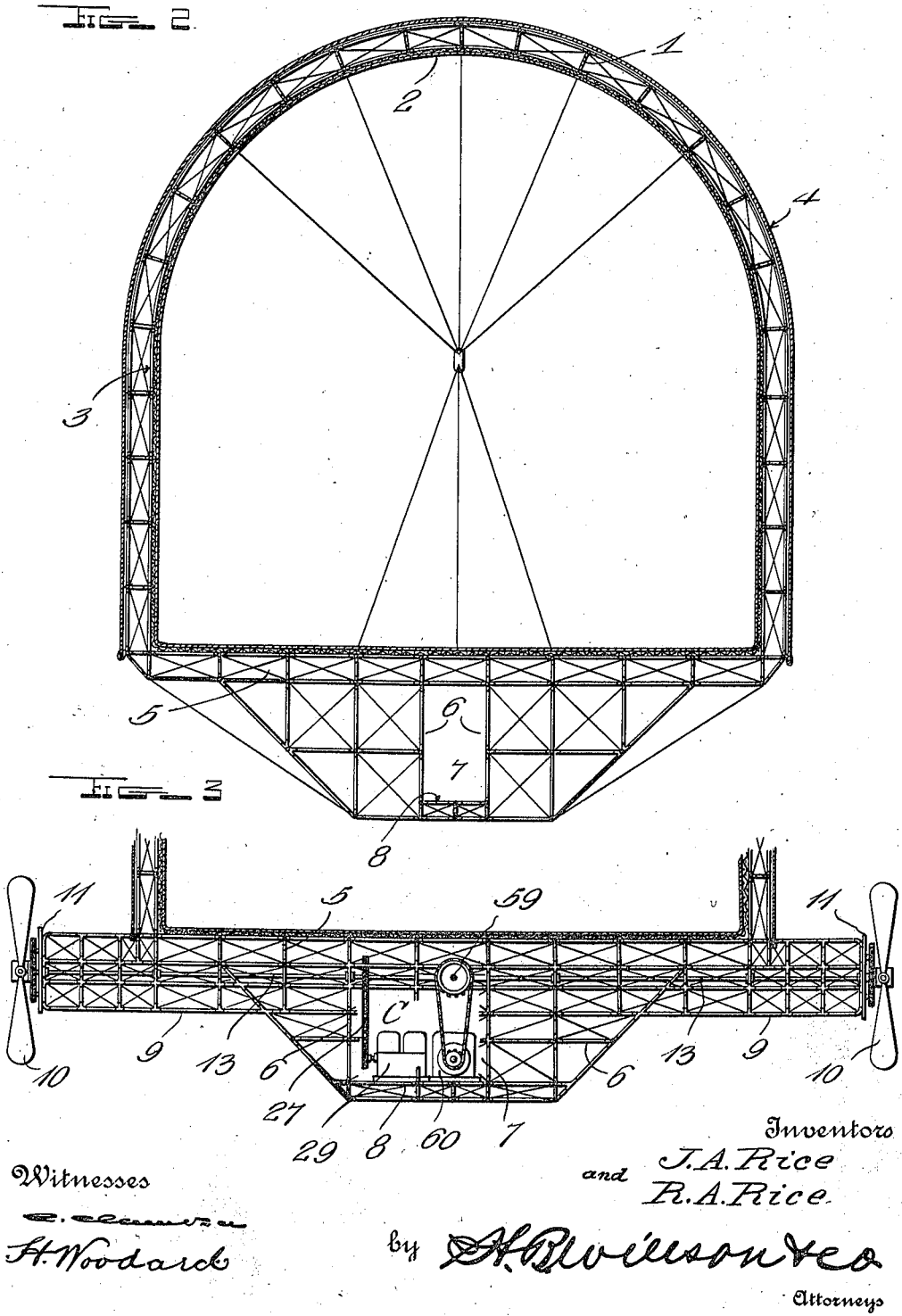

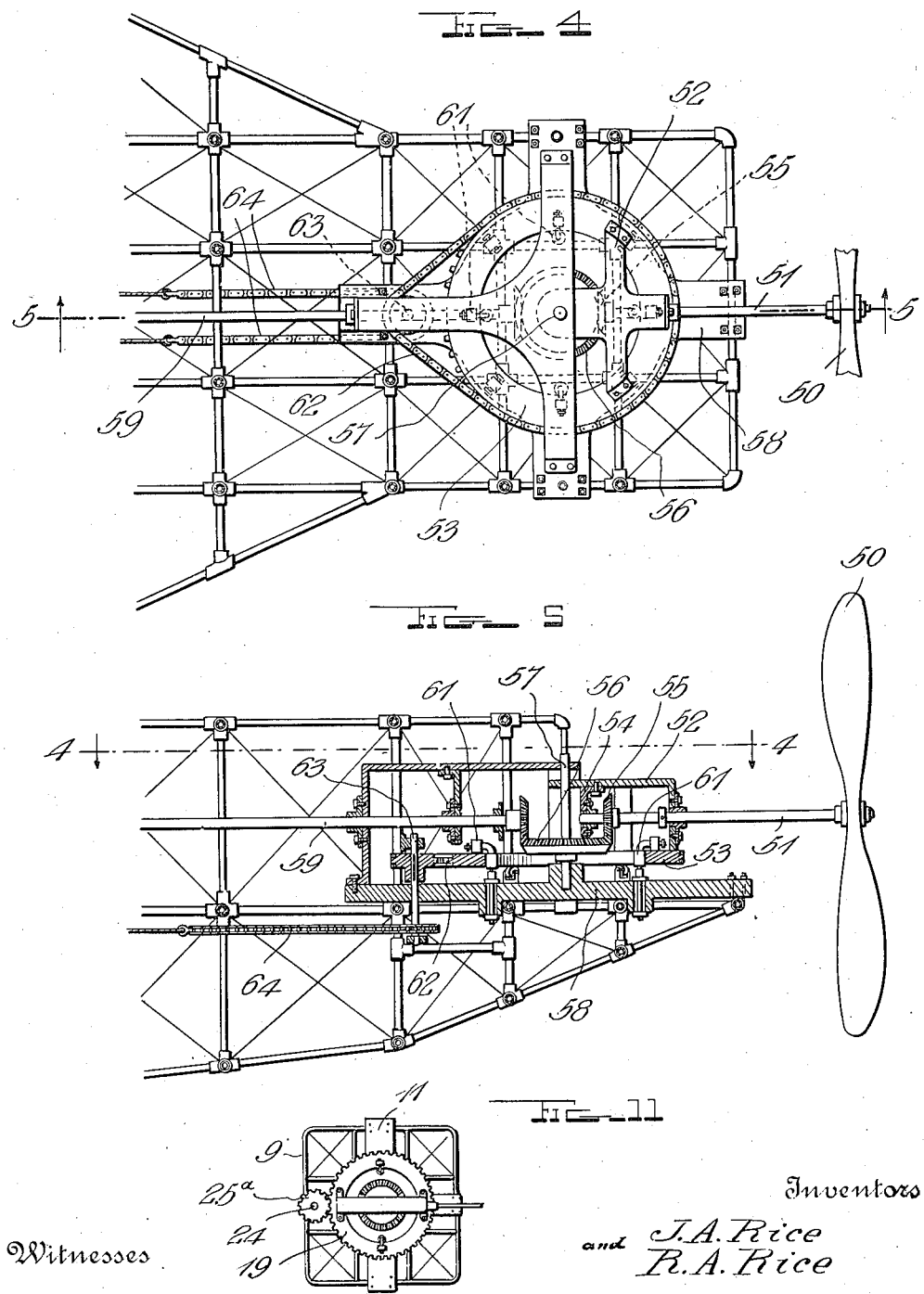

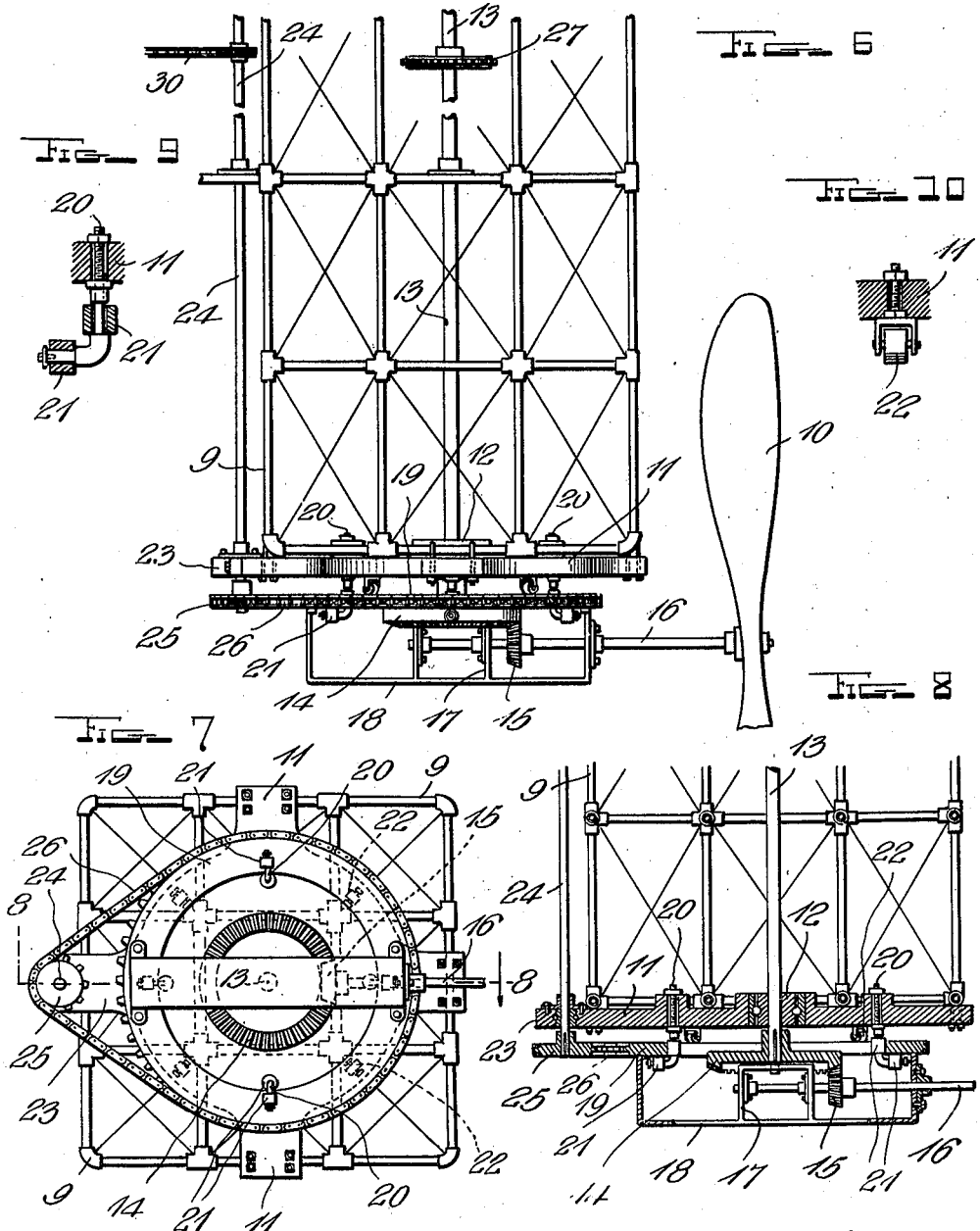

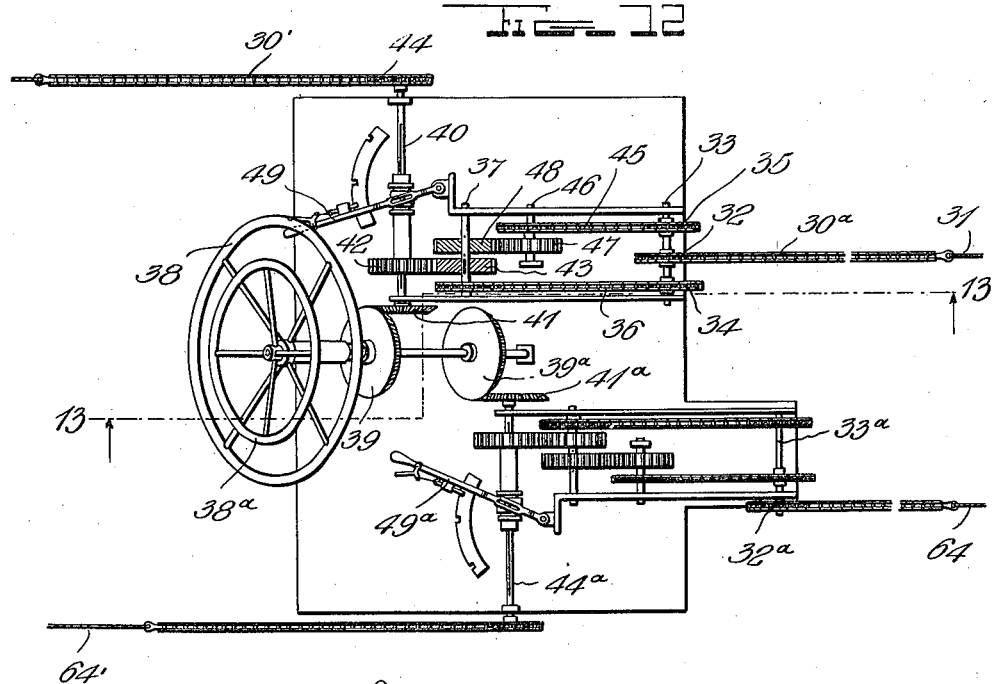
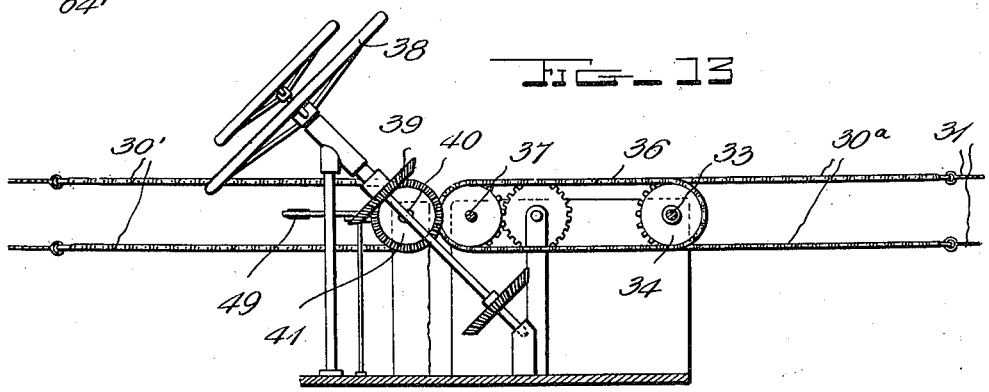
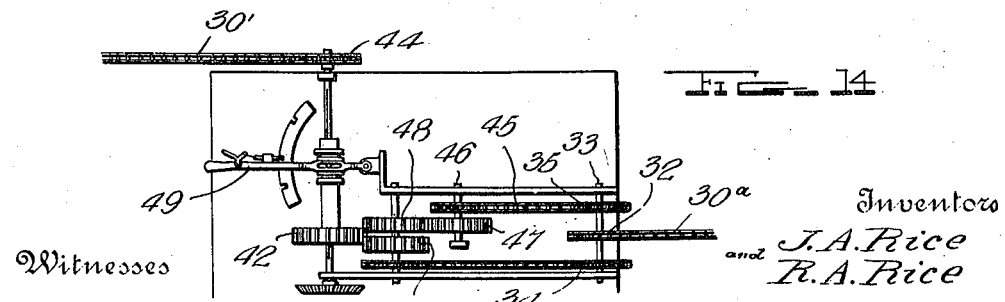

JOEL ALFONZO RICE AND ROYAL ALONZO RICE, OF NEW YORK, N. Y.

AIRSHIP.

1,185,824.   Specification of Letters Patent.   Patented June 6, 1916.

Application filed April 17, 1915. Serial No. 22,119.

*To all whom it may concern:*

Be it known that we, JOEL A. RICE and ROYAL A. RICE, citizens of the United States, residing at New York, in the county of New York and State of New York, have invented certain new and useful Improvements in Airships; and we do declare the following to be a full, clear, and exact description of the invention, such as will enable others skilled in the art to which it appertains to make and use the same.

Our invention relates to improvements in air craft and more particularly to those of the dirigible type, the object of the invention being to improve upon the general construction of machines of this class to such an extent as to provide a very efficient carrier, particularly novel controlling means being provided.

In reducing one embodiment of the invention to an operative construction, we provide a number of unique features of construction and combination hereinafter described and particularly pointed out in the claims.

In describing the invention, we shall refer to the accompanying drawings wherein like reference characters designate the same parts throughout the various views and wherein:

Figures 1 and 1ª when placed end to end represent a side elevation of an airship constructed in accordance with our invention; Fig. 2 is a vertical transverse section as seen on the line 2—2 of Fig. 1ª; Fig. 3 is an additional vertical transverse section taken on the line 3—3 of Fig. 1ª; Fig. 4 is a horizontal section through the framework at the front end of the machine and illustrating a top plan view of the propeller swinging mechanism at this point, this view being taken on the line 4—4 of Fig. 5; Fig. 5 is a detail vertical longitudinal section as seen along the plane indicated by the line 5—5 of Fig. 4; Fig. 6 is a top plan view of a portion of the framework showing more particularly the construction of the propeller mounting mechanism disposed to the sides of the machine; Fig. 7 is a side elevation of the parts in Fig. 6; Fig. 8 is a horizontal section taken on the line 8—8 of Fig. 7; Figs. 9 and 10 are details of the bearings employed for the rotatable propeller carrying rings; Fig. 11 is a view very similar to Fig. 7 and illustrating a slightly different form of construction; Fig. 12 is a top plan view of a portion of the floor of the pilot's quarters showing the propeller controlling mechanism disposed at this point; Fig. 13 is a detail longitudinal section taken on the line 13—13 of Fig. 12; and Fig. 14 is a fragmentary plan view similar to Fig. 12, showing certain gears to be described, in locked position.

In these drawings, constituting a part of the application, F and R denote respectively the front and rear ends of an airship constructed in accordance with our invention, such ship comprising a longitudinally disposed transversely arched frame structure 1, suitably shaped and trussed and receiving a gas bag 2, a covering 3 of netting or the like being preferably interposed between the bag 2 and the arched framework 1, while the latter is provided with a heavy covering 4 of canvas or the like. As clearly shown in Fig. 2, an additional framework 5 is joined to the lower ends of the arched work 1, said additional framework being extended beneath the gas bag 2 and the netting 3 disposed at the bottom thereof.

By the preceding description, it will be evident that an arched container is provided for the gas bag, and that since this container is provided with a covering 4, strong winds and eddies cannot affect the contour of the gas bag 2, as is the case if the same is unprotected. This is rather an important feature of the machine, since it obviously overcomes difficulties which have heretofore baffled the aeronautic world.

Extending throughout the length of the arched framework 1 and projecting beyond the ends thereof, is yet another framework 6 which is joined to the frame 5 as clearly disclosed in Figs. 2 and 3. This framework 6 is preferably provided with a longitudinal central hall-way 7 which leads through front and rear engine compartments C and C′ to the pilot's quarters Q. Needless to say, the structure of the framework 6 adjacent the compartments C and C′ must be reinforced by any preferred means such for instance as that seen at 8 in Figs. 1, 1ª and 3.

Adjacent the inner ends of the front and rear engine compartments C and C′, the framework 6 is provided with lateral extensions 9 and 9′ upon the ends of which front and rear side propellers 10 and 10′ are mounted by means now to be described. Since the mounting of the rear side propellers 10′ is identical with that of the front side propellers 10, the latter only are illustrated in detail in the drawings and will be herein described.

Secured to the opposite ends of the front lateral frame extension 9, are the attaching plates 11 which in the present embodiment of the invention stand in upright planes and are provided with bearings 12 at their centers, such bearings revolubly supporting the opposite ends of a transversely disposed horizontal drive shaft 13 whose ends project beyond the plates 11 and are provided with bevel gears 14 intermeshing with pinions 15 carried by the longitudinally disposed shafts 16 of the propellers 10, these shafts 16 being mounted in rectangular yokes 17 which extend inwardly from additional yokes or brackets 18, the latter being secured by any preferred means to the gear rings 19 which are disposed concentrically in respect to the drive shaft 13 and which are mounted independently of said shaft, being totally out of contact therewith.

Although practically any preferred means could well be provided for mounting the rings 19 to move concentrically around the shaft 13, thus adjusting the brackets 18 and propellers 10, right angular bearing members 20 are preferably provided for this purpose, such members having threaded shanks which are passed through and secured against movement in openings in the attaching plates 11, the two arms of each of the members 20 being provided with anti-friction rollers 21 which are disposed in contact with the inner curved edges of the rings 19 and in contact with the outer sides of said rings, the inner sides of the latter being here shown as abutting additional anti-friction bearings or rollers 22 carried by the plates 11 (see Figs. 8 and 10).

At suitable points, the plates 11 are provided with bearings 23 which project laterally from one of their edges and which rotatably support a transversely disposed horizontal steering shaft 24, the latter being either equipped with a pinion 25 and chain 26 passing around the same and around the ring 19, or with a gear ring 25ª intermeshing with the gear ring 19 as shown in Fig. 11. It will thus be seen that as the shaft 24 is rotated by means yet to be described, the bracket member 18 will be shifted concentrically around the drive shaft 13, thus moving the propeller shaft 16 and the propeller 10 thereon, thereby causing the front end of the machine to ascend, descend, or be propelled straight ahead, according to the positions of the bracket members 18 and the parts movable therewith.

In addition to the bearings 12 supporting the drive shafts 13, the outer ends of the latter are preferably reduced and inserted in bearings carried by the inner cross bars of the yokes 17, thus positively preventing the ends of said shaft from vibrating as the same is rotated at a high rate of speed by the chain or the like 27 driven by a gasolene motor 29 which is preferably of 100 H. P. It may here be explained, that regardless of the speed at which the propellers 10 are rotated, their thrust will not be exerted upon the gears 14 and 15, but upon the bearings carried by the bracket members 18, it being then in turn imparted to the rings 19, movement of the latter being then resisted by the bearing members 20 and 22. Heretofore, devices of this general class have been provided in which practically the equivalent of the rings 19 have been provided with a bearing receiving the drive shaft 13, this being the sole means of preventing such members from shifting transversely of said shaft. The result of this construction is that all longitudinal thrust exerted by the propellers is imparted through the aforesaid member to the drive shaft, thus causing all bearings of these parts to be extremely short lived. Particular emphasis is therefore laid upon the fact that the rings 19 are mounted totally independent of the drive shaft 13, this being obviously a salient feature of the invention.

Passing around a sprocket wheel carried by the steering shaft 24, is the looped front portion of an endless belt member 30, this front portion being preferably in the form of a sprocket chain as is likewise the rear looped portion 30ª, wires, cables or the like 31 being interposed between the two. The chain 30ª is passed around the driving or operating sprocket wheel 32 keyed upon a transverse shaft 33 disposed in the forward end of the pilot's quarters Q, additional sprockets 34 and 35 being likewise affixed to said shaft 33. The sprocket 34 is connected by a chain 36 to an additional sprocket on a second transverse shaft 37 which is disposed in rear of and in parallel relation to the shaft 33. The shaft 37 may be rotated at will by a hand wheel 38 which rotates the bevel gear 39 and thus imparts rotary movement to a third transversely disposed shaft 40 in rear of the shaft 37, through the instrumentality of an additional bevel gear 41 intermeshing with the aforesaid gear 39. The result is that the spur gear 42 slidably keyed upon the shaft 40 is driven, thus driving the spur gear 43 with which it is shown as being meshed in Fig. 12, said gear 43 being keyed upon the shaft 37, it being thus evident that when said shaft is rotated the chain 36 rotates the shaft 33 thus shifting the belt member 30 to rotate the steering shaft 24 an amount for angularly adjusting the propellers 10.

As likewise disclosed in Fig. 12, the rotation of the shaft 40 will drive the sprocket wheel 44 carried by the end thereof remote from the gear 41, thus shifting the belt member 30' which leads rearwardly from the pilot's quarters Q to the rear steering shaft 24', thus angularly adjusting the rear side propellers 10' simultaneously with the front propellers 10, it being evident that said propellers are adjusted in the same direction upon an arcuate path, and that the aforesaid propellers 10' are driven by a motor 29' likewise preferably of 100 H. P.

At times, it becomes expedient to adjust the front propellers 10 in a manner to allow the front end of the machine to be raised, and to adjust the propellers 10' in such a manner as to lower the rear end of the machine or vice versa. In order to accomplish this result, we provide practically any preferred type of reverse gear mechanism between the shaft 40 and the shaft 33, whereupon rotation of the hand wheel 38 in one direction will operate the belt member 30 in one direction, but will actuate the belt member 30' in the opposite direction, thus adjusting the front and rear propellers 10 and 10' in such a manner as to produce opposite results. In the present embodiment of the invention, the reverse gear includes the sprocket wheel 35 keyed on the shaft 33, the sprocket chain 45 leading rearwardly therefrom and over a sprocket wheel carried by a transverse shaft 46 interposed between the shafts 33 and 37, said shaft 46 being provided with a spur gear 47 intermeshing with an additional spur gear 48 running loosely upon the shaft 37 and spaced a slight distance from the gear 43 thereon. It will thus be evident that when the gear 42 is shifted out of mesh with the gear 43 and into mesh with gear 48, rotation of the hand wheel 38 will drive the two shafts 40 and 33 in directions to operate the belt members 30 and 30' in opposite directions, thus accomplishing the result desired.

Any preferred means may be provided for shifting the gear 42 into mesh with either of the gears 43 or 48 or to a neutral position as shown in Fig. 14, in which position the steering mechanism is locked. We prefer, however, to provide a hand lever 49 disposed adjacent the steering wheel 38, and a pawl and rack for locking said lever in its adjusted positions.

In addition to the propeller mechanism above described, the front and rear ends of the main framework 6 are provided with propellers 50 and 50' respectively which are mounted to swing laterally in horizontal planes. The mounting and the means of controlling the two propellers 50 and 50' is identical, so we will describe only the construction associated with the propeller 50. The latter is mounted upon the horizontally disposed propeller shaft 51 which is rotatably mounted in a bracket member 52 secured to a horizontally disposed gear ring or the like 53 similar to the gear rings 19 previously described, said bracket member preferably carrying a bearing 54 which receives the inner end of the shaft 51. Said inner end is provided with a bevel gear 55 intermeshing with a similar gear 56 keyed upon an upright drive shaft 57 one of whose ends is rotatably mounted in a horizontally disposed attaching or bed plate 58 which is secured to the projecting front end of the frame 6. As will be evident from the illustration, the plate 58 corresponds to the attaching plate 11 previously described, further description being therefore deemed unnecessary. The gear 56 and the drive shaft 57 are driven by a longitudinally disposed shaft 59 to which rotary movement is imparted by a motor 60 preferably of the gasolene type and of 50 H. P., the rear propeller 50' being driven in the same manner by a 50 H. P. motor 60', it being evident from the drawings that the motors 29 and 60 are disposed in the front engine room or compartment C while the engines 29' and 60' are disposed in the rear compartment C'.

As is the case with the ring 19, the ring 53 is mounted upon appropriate L-shaped bearings 61 to move concentrically around the drive shaft 57, this movement being imparted to said ring by a chain 62 passing around the same and around a pinion on the steering shaft 63 the latter performing the same function as the steering shaft 24 hereinbefore described, and being provided with a sprocket around which the front looped portion of an endless steering belt 64 passes, the rear portion of said belt (see Fig. 12) being passed around a sprocket wheel 32ª which is secured to the transverse shaft 33ª. The sprocket 32ª and the shaft 33ª correspond with the sprocket 32 and shaft 33 previously described and said parts 32ª and 33ª coact with additional driving and reversing mechanism identical with that for shifting the belts 30 and 30', said additional mechanism including a transverse shaft 44ª driven by the bevel gears 39ª and 41ª from an additional hand wheel 38ª which is disposed concentric with the steering wheel 38 but which is preferably of less size. It will thus be seen that rotation of the wheel 38ª will through the instrumentality of bevel gears 39ª and 41ª shift the belt 64 in one direction, when the controlling means 49ª (corresponding to the lever 49) is disposed in proper position, during which movement the shaft 44ª is of course rotated, thereby shifting an additional belt member 64' which leads rearwardly from said shaft to a sprocket wheel on the steering shaft 63ª of the rear propeller mounting mechanism.

It will thus be evident that the two propellers 50 and 50' may be shifted simultaneously in the same direction around arcuate paths, or that by proper manipulation of the lever 49ª the belt members 64 and 64' may be shifted in opposite direction, thus causing said propellers 50 and 50' to travel simultaneously in opposite directions around arcuate paths. This is undoubtedly of great advantage in making abrupt turns, while the two propellers in question may be both shifted to one side of the machine for the purpose of overcoming a stiff wind as will be readily understood by those skilled in the art to which the invention relates.

From the foregoing description, taken in connection with the accompanying illustration, it will be evident that although comparatively simple construction has been provided for carrying out the object of the invention, the complete machine will be very efficient in operation and will possess unique means of control, particular emphasis being laid upon the general arrangement of the numerous controlling elements as well as upon the mounting of the numerous propeller adjusting rings and bracket members independently of the driving shafts.

In the accompanying drawings we have shown certain specific details of construction for accomplishing probably the best results, and in the preceding we have described such details. It will be evident, however, that we need not be limited thereto otherwise than to the extent to which the appended claims limit us, it being evident that numerous minor changes in construction, proportions of parts, character of material used, etc., may be resorted to without departing from the spirit or sacrificing any of the advantages of the invention as claimed.

We claim:

1. An airship having two swinging propellers movable simultaneously in the same direction on arcuate paths, or simultaneously in opposite directions on such paths, and a single steering mechanism for said propeller formed in two units operable simultaneously in the same direction or simultaneously in opposite directions from a single control member.

2. An airship having two swinging propellers movable simultaneously in the same direction on arcuate paths, or simultaneously in opposite directions on such paths, a pair of steering members for the two propellers, means to manually operate one of said members, and connections between the two members including a reverse gear.

3. An airship having front and rear laterally swinging propellers movable simultaneously in the same direction on arcuate paths, or in reverse directions on such paths, and additional front and rear vertically swinging propellers disposed at the sides of the ship and movable simultaneously in the same directions on arcuate paths, or simultaneously in opposite directions on such paths; in combination with a single steering gear for the first-named propellers, and an additional single steering gear for the other propellers.

4. An airship having two swinging propellers movable simultaneously in one direction on arcuate paths, or simultaneously in opposite directions on such paths, a pair of belt members for steering the two propellers, actuating wheels over which the two belt members pass, manually controlled means to rotate the two wheels in the same direction, and means to reverse the movement of one of said wheels.

5. In combination, a drive shaft, a bracket member movable concentrically around the same and including a ring disposed concentrically to said shaft, L-shaped bearing members having their two arms disposed contiguous to one curved edge and to one side of the ring, anti-friction devices carried by said arms and disposed in contact with the ring, and a propeller shaft mounted on the bracket member and driven by the drive shaft.

6. An airship having front and rear laterally swinging propellers at its front and rear ends, additional front and rear vertically swinging propellers on the sides of the ship, a control member for the first-named propellers, connections between said member and said propellers including a reverse gear between said member and one propeller, an additional control member for the second named propellers, and additional connections between the latter and said additional member including a second reverse gear between said member and one propeller.

In testimony whereof we have hereunto set our hands in presence of two subscribing witnesses.

JOEL ALFONZO RICE.
ROYAL ALONZO RICE.

Witnesses:
J. T. RICE,
RUDDY WETTEKIND.